(12) United States Patent
Honary

(10) Patent No.: US 6,288,794 B1
(45) Date of Patent: Sep. 11, 2001

(54) VARIABLE SAMPLE RATE CONVERTER ADAPTABLE TO RATIONAL RATIOS

(75) Inventor: Hooman Honary, Newport Beach, CA (US)

(73) Assignee: Conexant Systems, Inc., Newport Beach, CA (US)

(*) Notice: Subject to any disclaimer, the term of this patent is extended or adjusted under 35 U.S.C. 154(b) by 0 days.

(21) Appl. No.: 09/192,617

(22) Filed: Nov. 16, 1998

(51) Int. Cl.⁷ .......................... B41B 15/00; B41J 15/00; H04N 1/04; G06K 9/20; G06K 9/36

(52) U.S. Cl. ..................... 358/1.2; 358/1.1; 358/474; 358/486; 358/294; 382/322; 382/323; 382/275; 382/131

(58) Field of Search ................................ 382/322, 323, 382/275, 131, 280; 358/474, 486, 494, 294, 1.2, 1.1

(56) References Cited

U.S. PATENT DOCUMENTS

| | | | |
|---|---|---|---|
| 5,168,375 | * 12/1992 | Reisch et al. | 358/432 |
| 5,757,867 | 5/1998 | Caulfield et al. | |
| 5,774,598 | * 6/1998 | Sushine et al. | 382/250 |

FOREIGN PATENT DOCUMENTS

0629044A1  12/1994  (EP).
9424632A   10/1994  (WO).

OTHER PUBLICATIONS

Ronald E. Crochiere and Lawrence R. Rabiner, "Interpolation and Decimation of Digital Signals—A tutorial Review", Proceedings of the IEEE, Mar. 1981, vol. 69, No. 3, pp. 300–331.

* cited by examiner

Primary Examiner—Edward Coles
Assistant Examiner—Twyler Lamb
(74) Attorney, Agent, or Firm—Akin, Gump, Strauss, Hauer & Feld, L.L.P.

(57) ABSTRACT

A variable sample rate converter, adaptable to rational ratios, converts a plurality of data having a first sample rate to a plurality of data having a second sample rate. The variable sample rate converter is employed in data processing devices including, for example, color photo-copy machines, color facsimiles, color printers, black and white printers, digital cameras, and digital printers. A finite impulse response filter is employed to perform processing of the plurality of data. Any processing hardware capable of performing floating point processing may employ the variable sample rate converter. A ping-pong style buffer is employed to assist in transferring the plurality of data. The variable sample rate converter combines the two steps of up-sampling and down-sampling into a single step, thereby maximizing available processing resources.

20 Claims, 5 Drawing Sheets

VARIABLE SAMPLE RATE CONVERTER ADAPTABLE TO RATIONAL RATIOS

BACKGROUND

1. Technical Field

The present invention relates generally to sample rate conversion in data processing systems; and, more particularly, it relates to variable sample rate conversion used in data processing systems that perform rational ratio conversion of the sample rate.

2. Description of Prior Art

Within conventional communication systems, the interfacing of various devices operating at various data transmission rates invariably requires the conversion of the data transmission rates between the various devices. For example, when one device operating at a first data transmission rate communicates with a second device operating at a second data transmission rate, there must be some method by which the data can be converted between the two devices while preserving the information contained within the plurality of data. Ideally, this conversion is performed in a manner that maintains a maximum throughput within the communication system. The data transmission rate itself may be viewed as a sample rate in such conventional communication systems. Typically, the various devices within the communication system each operate according to various, sometimes internal, clock frequencies. Similarly, the data transfer to and from these devices is associated with this clock frequency. The interfacing of the various devices, each possibly being driven by a different clock frequency, creates an interfacing difficulty.

One common application area for such data conversion is in television displays. Various television display standards exist for displaying image data. For example, one common standard is the National Television System Committee (NTSC). Another common standard is the phase alternate line (PAL) standard. A difficulty arises when a user attempts to interface a peripheral device, such as a video cassette recorder (VCR), that operates using one standard with a television display operating at another. Some method for converting the image data must be employed for proper communication between the devices and ultimate display for the user.

Within various stand alone image processing devices including photo-copy machines and video display units, enlargement and reduction of image data is often performed. From one perspective, the image data having a first resolution may be viewed as data having a first sample rate. Typically, the sample rate is associated with the number of pixels per distance along a given trajectory of the image data. This sample rate is often given in terms of dots per inch (dpi) in printing systems and simply as screen resolution for video display units, i.e. 640×480, 800×600, 1024×768, etc. This screen resolution typically corresponds to the number of pixels that are displayed at any given time across the viewable portion of the video display unit. When enlarging or reducing such image data using such devices, a user typically desires to preserve the resolution of the image data as much as possible. Still, the limitation remains, particularly with enlargement, that the image data only possesses a fixed amount of information. A difficulty lies in how to expand the finite amount of data available to display as if it were a larger amount of data; the difficulty is how to increase the viewable size of the image data while preserving the visible perceptual quality of the image data.

One common limitation within such conventional stand alone devices is the inability to perform rational ratio conversions of either enlargement or reduction of an image. This stems from the inability of many conventional systems to perform sample rate conversion using rational ratios. Common within such systems, the option of enlarging or reducing an image by a number of fixed amounts is provided, e.g. 16%, 32%, 64%, etc. However, the ability to perform arbitrary values of reduction and enlargement is seldom provided. For stand alone conventional devices which do provide for arbitrary data conversion rates, there is often associated a high computational cost corresponding to the hardware required to perform such a function. In many applications where system cost is a hard design constraint, the user is typically provided with selection from a predetermined number of choices for performing enlargement or reduction, as the associated cost to provide such a high level function is simply prohibitive. A cost effective solution to provide for arbitrary conversion rates of data would be well suited for many such stand alone devices.

One conventional method for performing conversion of data having a first sample rate to data having a second sample rate uses a very inefficient method including up-sampling and down-sampling. This conventional method typically performs operation and filtering on the up-sampled data that contains an abundance of either redundant or useless information. Typically within digital systems which convert a plurality of data from a first sample rate to a plurality of data having substantially similar characteristics yet having a second sample rate, the original plurality of data is up-sampled by inserting a number of zeros into the plurality of data. During this process, the plurality of data is up-sampled by the number of zeros that have been introduced. These inserted zeroes provide no new information to the original plurality of data. They merely serve as placeholders within the up-sampled data.

Typically and undesirably, the up-sampled plurality of data is filtered when it is in this highly redundant state. This is computationally intensive, as the inserted zeroes must be processed during the filtering. The system has no method by which it can detect which samples are actual data and which are inserted zeroes. This processing of the inserted zeroes adds no new information to the plurality of data. For up-sampling of extremely large numbers, this is very undesirable due to the wasteful appropriation of processing resources in such systems. For example, if a plurality of data is up-sampled by a factor of ten, the up-sampled plurality of data is then processed in the time which will take approximately ten times as long as would be required for the original plurality of data, assuming a substantially linear processing function of processing time in terms of data.

Later, the filtered signal is then down-sampled wherein only a predetermined number of the samples of the up-sampled, post-filtered plurality of data are selected. For example, for a down-sampling by a factor of two, every other data sample would be taken from the plurality of data, thereby reducing the amount of information by the factor of two. The filtering is performed when the plurality of data is at the up-sampled state in an effort to minimize resolution loss during the subsequent down-sampling step. In other embodiments, a single datum value is calculated for every two data within the plurality of data. Such a method employs an averaging scheme. In either case, a predetermined number of the data is discarded during the down-sampling step using this conventional approach.

Ultimately, the conversion rate is the ration between the up-sampling and the down-sampling rates. For example, if the plurality of data is up-sampled by a factor or twenty and down-sampled by a factor of thirteen, then the conversion ratio would be twenty thirteenths (20/13). As can be seen in this trivial example, the insertion of as many as twenty zeroes is often associated with conversion rates that do not even approach a factor of two. This example is demonstrative of the potentially extreme inefficiency of this conventional method.

A typical modification of the conventional method of up-sampling and down-sampling is performed in an effort to provide for more efficient use of a data converter's resources. One solution is to employ a finite impulse response filter to the plurality of data before the up-sampling step and after the down-sampling step. While this solution is more optimal that the conventional method described above in that there is no filtering performed at the highly redundant intermediary state, it is nevertheless inefficient in that a filtering step is performed two different times. Additionally within this modified conventional method, even though the filtering is performed at the states where the plurality of data is relatively smaller than at the intermediary state after up-sampling yet before down-sampling, some manner must be implemented to accommodate this large sized data.

Further limitations and disadvantages of conventional and traditional systems will become apparent to one of skill in the art after reviewing the remainder of the present application with reference to the drawings.

SUMMARY OF THE INVENTION

Various aspects of the present invention can be found in a variable sample rate converter adaptable to rational ratios that converts a plurality of data having a first sample rate to a plurality of data having a second sample rate. The sample rate may be viewed as being a variety of characteristics including bit rate and image data resolution. Conversion of data transmission bit rate is performed in communication systems having a plurality of input/output devices wherein at least two of the input/output device operate at different sampling rates. Enlargement or reduction of image data is performed in image processing systems that employ the variable sample rate converter built in accordance with the present invention.

In certain embodiments of the invention, the variable sample rate converter may be employed in data processing devices including color photo-copy machines, color facsimiles, color printers, black and white printers, digital cameras, and digital printers.

In other embodiments of the invention, two control buffers perform selection of a predetermined number of data and indexing of a finite impulse response filter. From the finite impulse response filter, a predetermined number of phases are selected to process the predetermined number of data using a coefficient control buffer. From a plurality of data, the predetermined number of data is selected using a data control buffer. In certain embodiments of the invention, the predetermined number of data are processed using the predetermined number of phases in a multiply-add operation using a digital signal processor. In response to a predetermined number of clock signals, the predetermined number of data are consumed thereby effectively changing the sample rate of the data.

Other aspects, advantages and novel features of the present invention will become apparent from the following detailed description of the invention when considered in conjunction with the accompanying drawings.

BRIEF DESCRIPTION OF DRAWINGS

FIG. 2 illustrates a variable sample rate converter that converts an incoming plurality of data to an outgoing plurality of data wherein each of the pluralities has a different sampling rate.

FIG. 3 illustrates a sample rate converter having various functional elements arranged in accordance with the present invention.

FIG. 4 illustrates a specific embodiment of a finite impulse response filter built in accordance with the present invention as described in FIG. 3.

FIG. 5 illustrates a specific method that employs the system as described in FIGS. 1–4.

DETAILED DESCRIPTION OF DRAWINGS

Figure 1:
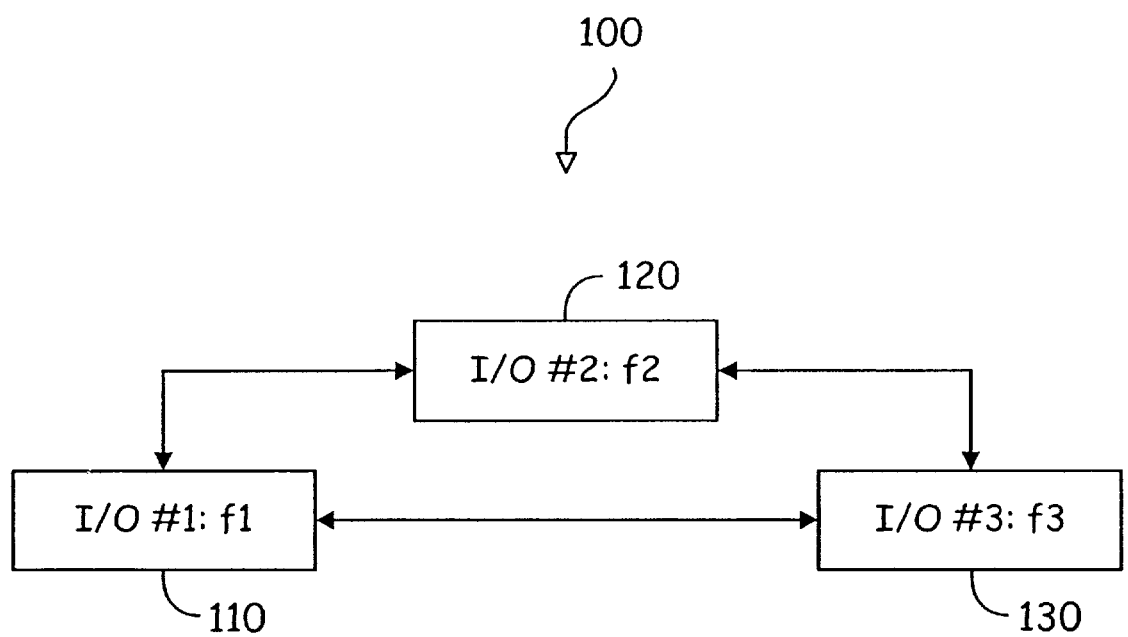
FIG. 1 is a system diagram depicting the present invention that, in one embodiment, operates within a communication system having a plurality of input/output devices wherein each input/output device operates at a different sampling rate.

FIG. 1 is a system diagram depicting the present invention that, in one embodiment, operates within a communication system 100 having a plurality of input/output devices wherein at least two of the input/output device operate at different sampling rates. In certain embodiments, the communication system 100 is a local area. An example of a local area network is a network connected all the individual computers within a company. In other embodiments, the communication system 100 is a portion of the internet wherein various devices communicate at different data transmission rates. Alternatively, the communication system 100 is a wireless communication system in other embodiments. The present invention may be applied to any communication system, not necessarily one similar to the communication system 100 described in FIG. 1, in which data is transferred among a variety of devices wherein at least two of the devices operate at different sampling rates.

In communication system applications, the data transmission rate may be viewed as a sample rate. Invariably within such communication systems, a variety of different devices communicate to one another, and it is not uncommon that many of the device operate at different sample rates. As shown in FIG. 1, a first input/output device 110 communicates with a second input/output device 120 and a third input/output device 130 via the communication system 100.

In stand alone applications, the various input/output devices 110, 120, and 130 are viewed as being various functional elements within a single device. For example, the communication system 100 is a single device that contains multiple internal devices that communicate with one another, yet at least two of the internal devices operate at different sampling rates. Examples of stand alone devices include color photo-copy machines, color facsimiles, color printers, black and white printers, digital cameras, and digital printers. Within each of these stand alone devices, a variety of processing circuitry operates cooperatively to perform the overall function of the stand alone device. These various functions include data acquisition, data processing, data transmission, data reproduction, and data display.

Figure 2:
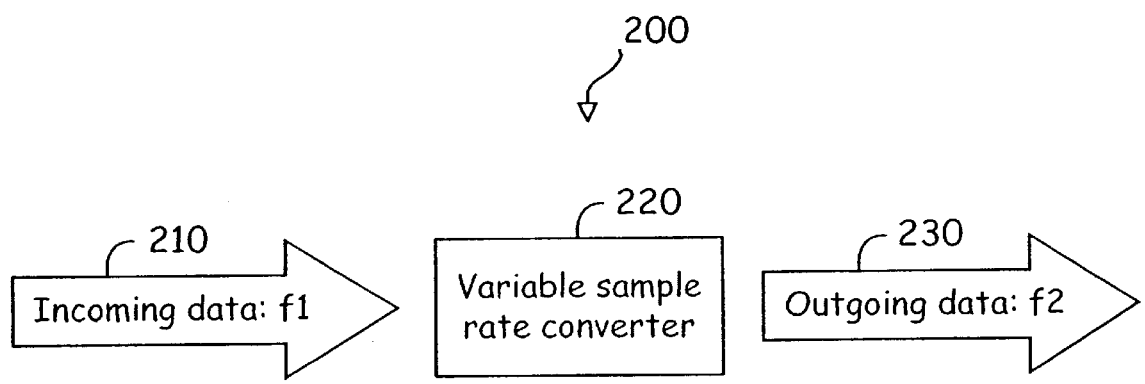
FIG. 2 is a system diagram illustrating another embodiment of the present invention. In particular.

FIG. 2 is a system diagram illustrating another embodiment of the present invention. In particular, FIG. 2 illustrates a data conversion system 200 having a variable sample rate converter 220 that converts an incoming plurality of data 210 to an outgoing plurality of data 230 wherein each of the pluralities has a different sampling rate. In certain embodiments of the present invention, the incoming plurality of data 210 is image data that has been acquired via a scanner. Such scanners that perform data acquisition or image capture of two-dimensional image data are common in applications such as color photo-copy machines, color facsimiles, color printers, and digital cameras. The incoming plurality of data 210 is often converted to the outgoing plurality of data 220 wherein the outgoing plurality of data 220 is an enlarged or reduced image. When the image data is acquired by the device, it has a given resolution (pixels per distance). Image data having the given resolution may be viewed as image data having a given sample rate.

Enlargement and reduction of the image data requires a method that converts the sample rate of the data to another sample rate. A difficulty is to preserve a resolution that is substantially visibly imperceptible from the first sample rate so that the image data can be reproduced or displayed. While in certain embodiments the resolution is maintained (the given number of pixels per distance is the same in both the incoming plurality of data 210 and the outgoing plurality of data 230), the total amount of data within the outgoing plurality of data 230 is nevertheless different than the incoming plurality of data 210. The present invention provides a solution for expanding and reducing the sample rate of a plurality of data while substantially preserving the information contained within the plurality of data.

Figure 3:
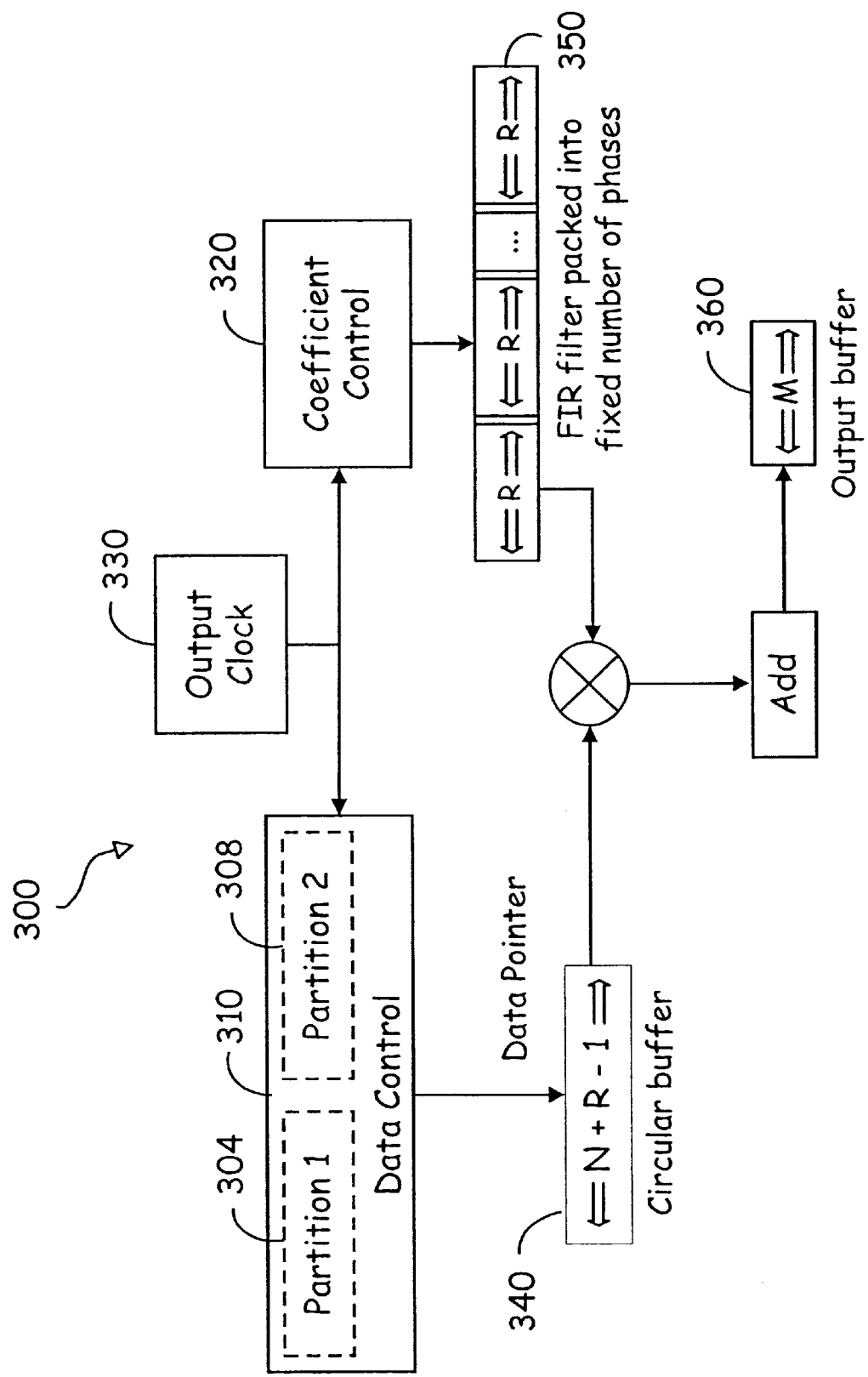
FIG. 3 is a system diagram illustrating another embodiment of the present invention. In particular.

FIG. 3 is a system diagram illustrating another embodiment of the present invention. In particular, FIG. 3 illustrates a sample rate converter 300 having various functional elements arranged in accordance with the present invention. A data control buffer 310 is used to control a flow of incoming data. In certain embodiments, data control buffer 310 is used to control the incoming plurality of data 210. In other embodiments, the data control buffer 310 is partitioned into at least two portions, a first partition 304 and a second partition 308. This partition may be viewed as that of a ping-pong style buffer in which data is transmitted into one of either the first partition 304 and the second partition 308, and data is transmitted from the other partition. Such an implementation serves to maximize the transfer of data into and out of the data control buffer 310.

The data control buffer 310 receives a clock signal from an output clock 330. The sample rate converter 300 contains several devices, many of which operate according to the clock signal of the output clock 330. The data control buffer 310 selects which of the incoming plurality of data 210 are to be required to generate a portion of the outgoing plurality of data 230; the selected portion of the incoming plurality of data 210 are placed into a circular buffer 340. The data control buffer 310 serves as a pointer in determining how many data from the incoming plurality of data 210 are to be inserted into the circular buffer 340. Additionally, the data control buffer 310 calculates the minimum amount of data that will be selected from the incoming plurality of data 210 to be inserted into the circular buffer 340. This minimum amount of data is the product of the conversion rate multiplied by the clock signal from the output clock 330. In certain embodiments, the portion of the outgoing plurality of data 230 is the output buffer 360 which is generated after processing the incoming plurality of data 210 using the sample rate converter 300.

A coefficient control buffer 320 also receives the clock signal from the output clock 330. The coefficient control buffer 320 controls an indexing sequence of a finite impulse response filter 350. Individual phases of the finite impulse response filter 350 are selected for actual processing of the data within the circular buffer 340 as will be shown in the particular embodiment FIG. 4. The coefficient control buffer 320 selects which of these phases are required for processing the data within the circular buffer 340.

In certain embodiments, the individual phases selected from the finite impulse response filter 350 correspond exactly to the number of data contained within the circular buffer 340. In other embodiments, the individual phases selected from the finite impulse response filter 350 correspond to the up-scaling to be performed on the incoming plurality of data 210. The phases selected from the finite impulse response filter 350 are coefficients which are used to perform a multiply-add operation on the data within the circular buffer 340. The coefficients are multiplied with the data contained within the circular buffer 340 and the products are accumulated within the output buffer 360. A quantization error is associated to the total number of phases within the finite impulse response filter 350. The quantization error is inversely proportional to the total number of phases within the finite impulse response filter 350. The maximum quantization error is one-half of the distance between adjacent data within the data within the circular buffer 340 divided by the total number of phases in the finite impulse response filter 350.

The amount of data that is inserted into the output buffer 360 is determined by the minimum amount of data (the product of the conversion rate multiplied by the clock signal from the output clock 330) that is calculated using the data control buffer 310. Because the circular buffer 340 contains the minimum amount of data as calculated using the data control buffer 310, after a predetermined number of clock signals received from the output clock 330, a predetermined number of data from the incoming plurality of data 210 will be consumed.

This transformation effectively changes the sample rate from a first sample rate corresponding to the incoming plurality of data 210 to a second sample rate corresponding to the outgoing plurality of data 230. For example, if the desired conversion rate change in the rational ratio M/N, then N data from the incoming plurality of data 210 are consumed after M clock signals have been emitted from the output clock 330. The sample rate of the outgoing plurality of data 230 has been changed by the conversion rate corresponding to M/N. In certain embodiments of the invention, the real advantageous operation is provided by the pointer updating by the data control buffer 310 in selecting which data are inserted into the circular buffer 340 and the selection of the appropriate phases of the finite impulse response filter 350 using the coefficient control buffer 320. The sample rate converter 300 may be implemented on virtually any digital signal processor (DSP) or similar processing hardware capable of performing floating point multiply-add operations.

Figure 4:
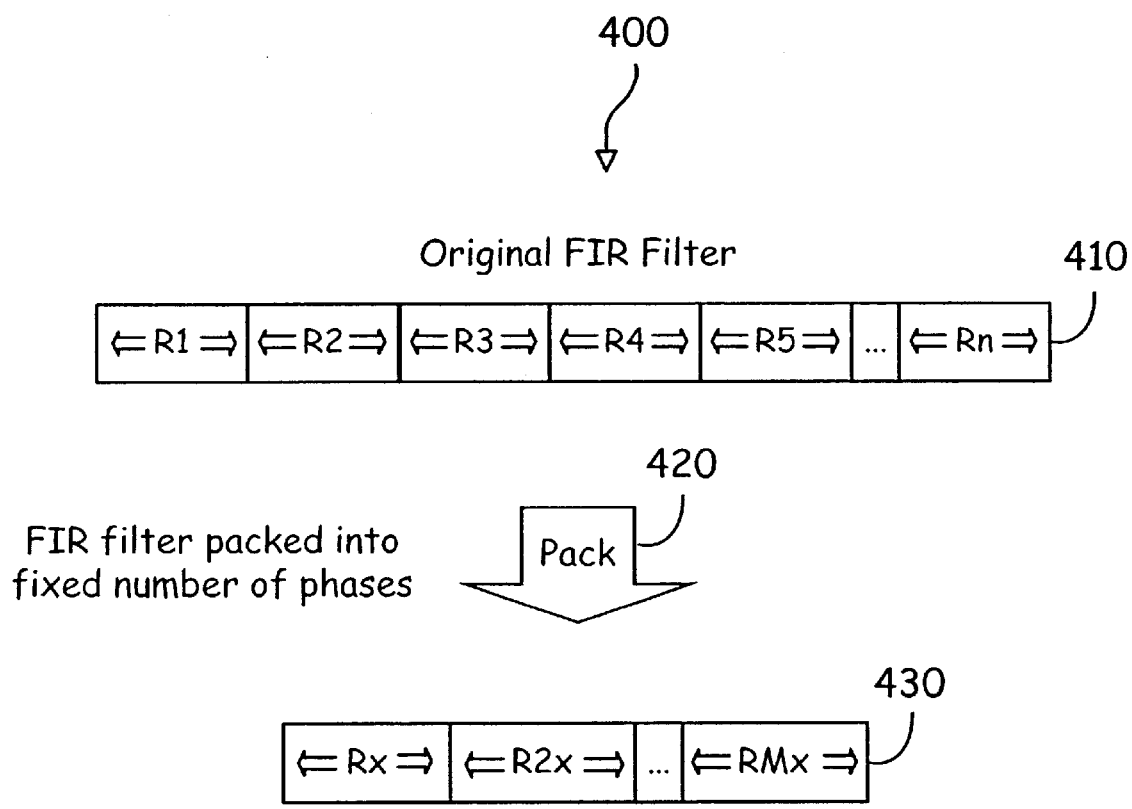
FIG. 4 is a system diagram illustrating another embodiment of the present invention. In particular.

FIG. 4 is a system diagram illustrating another embodiment of the present invention. In particular, FIG. 4 illustrates a specific embodiment 400 of a finite impulse response filter 410 built in accordance with the present invention as described in FIG. 3. As described above in FIG. 3, an operational advantage is the selection of specific phases from the finite impulse response filter 350. In this specific embodiment, a finite impulse response filter 410 contains 'n' phases. In a block 420, a predetermined number of phases are selected from the finite impulse response filter 410 and inserted into a packed finite impulse response filter 430. These selected phases are then used to perform the processing of the incoming plurality of data 210, and more specifically, the data within the circular buffer 340, to form the data that is inserted into the output buffer 360. These phases are appropriately chosen to perform the processing as described in FIG. 3. In certain embodiments of the invention, the number of selected phases used to form the packed finite impulse response filter 430 is precisely the number of data contained within the circular buffer 340.

Figure 5:
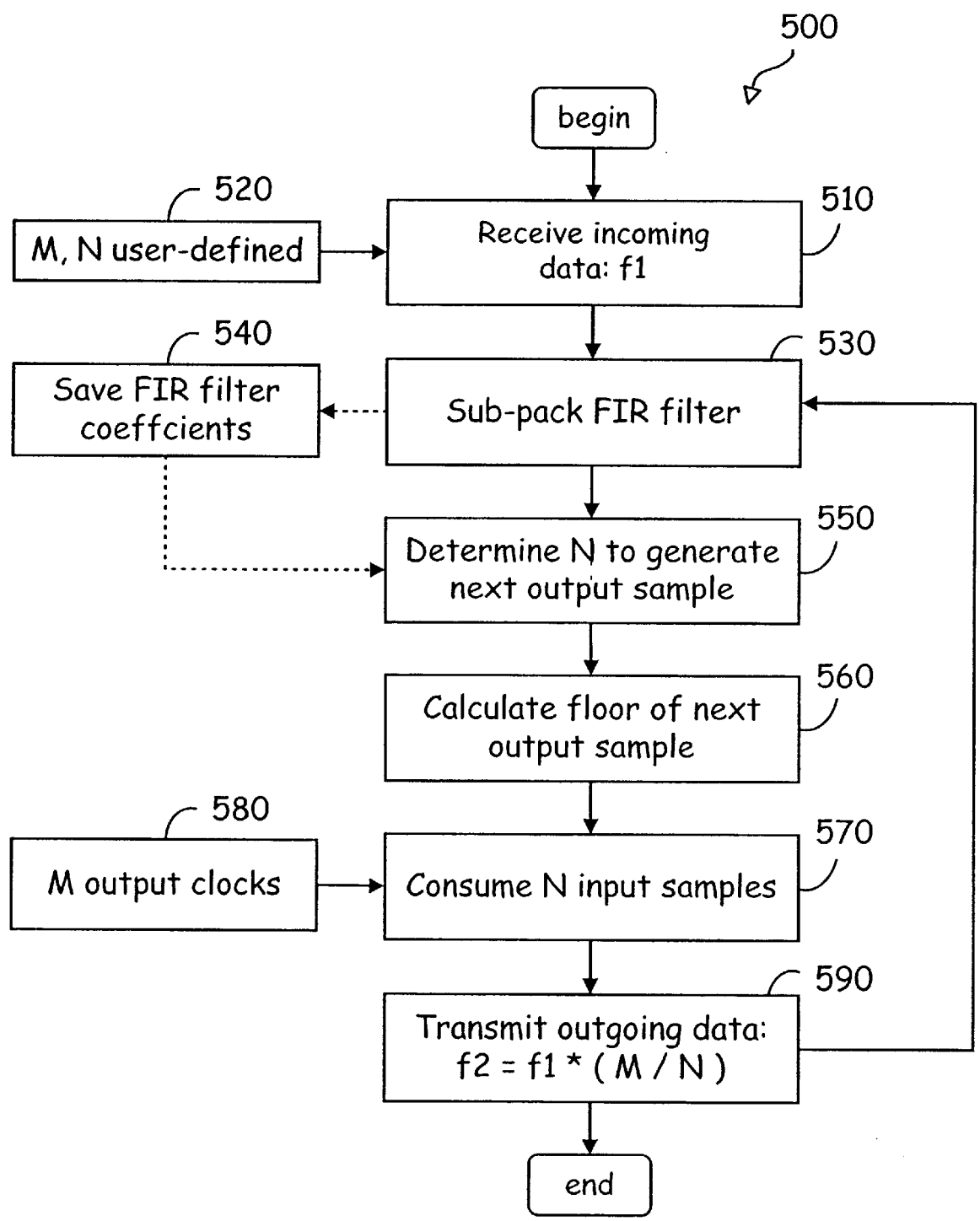
FIG. 5 is a functional block diagram illustrating another embodiment of the present invention. In particular.

FIG. 5 is a functional block diagram illustrating another embodiment of the present invention. In particular, FIG. 5 illustrates a specific method 500 that employs the system as described in FIGS. 1–4. As described above in a specific example, the conversion to be performed on a plurality of data may be represented as a rational ratio M/N. Certainly, the conversion ratio may be a non-rational ratio as well, i.e. an integer ratio. This conversion ratio is defined by a user selecting the values M and N in a block 520. In certain embodiments, this ratio is selected using a data entry keypad. In other embodiments, it is selected using a different man to machine interface. If desired, the conversion ratio may be stored in a memory from which the user then selects a particular conversion ratio.

An incoming plurality of data is received in a block 510. In certain embodiments, the incoming plurality of data is the incoming plurality of data 210. Subsequently, a finite impulse response filter is sub-packed in a block 530. This sub-packing is performed in accordance with the description provided in FIG. 4 in certain embodiments of the invention thereby producing the packed finite impulse response filter 430. If desired, the phases selected from the finite impulse response filter may be stored in a block 540. These stored phases, which constitute coefficients of the finite impulse response filter in certain embodiments, are used for processing of subsequently received data.

In a block 550, the data which are required to produce the next input sample are selected. In certain embodiments of the invention, this step is the selection of the data from the incoming plurality of data 210 to be inserted into the circular buffer 340 using the data control buffer 310. In a block 560, a floor is calculated which is used to produce the next portion of output data. In certain embodiments, the floor is the minimum amount of data calculated by the control buffer 310 that is selected from the incoming plurality of data 210 to be inserted into the circular buffer 340. In a block 570, a predetermined number of data are consumed in response to a predetermined number of output clocks provided by a block 580. In certain embodiments, the step of the block 570 is the consumption of a predetermined number of the incoming plurality of data 210 in response to a predetermined number of clock signals received from the output clock 330.

Effectively, the incoming plurality of data 210 has been transformed to the outgoing plurality of data 230 after the processing of the block 570. In certain embodiments of the invention, particularly those employed within a communication system such as the communication system 100, the outgoing plurality of data 230 is transmitted in a block 590. In certain embodiments, this transmission includes the storing of the outgoing plurality of data 230 in a manner suitable for subsequent reproduction using any of the display and reproduction devices described above. In certain embodiments, the specific method 500 is performed again after the outgoing plurality of data 230 has been transmitted in the block 590.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. An image processing system used to convert a plurality of data from a first sample rate to a second sample rate, the first and second sample rates being associate to a clock signal, the image processing system comprising:
   a data control buffer;
   a coefficient control buffer;
   a processor that selects a predetermined number of data from the plurality of data using the data control buffer, the predetermined number of data having a first sample rate;
   a phase filter that is indexed using the coefficient control buffer, the phase filter having a plurality of phases;
   a sub-phase filter formed from a predetermined number of phases, the phases being selected from the indexed phase filter, the predetermined number of phases being the same number as the predetermined number of data;
   the processor uses the sub-phase filter to operate on the predetermined number of data using the sub-phase filter to form a plurality of processed data; and
   the processor selects a predetermined number of the plurality of processed data in response to a predetermined number of clock signals, the selected predetermined number of the plurality of processed data having the second sample rate.

2. The image processing system of claim 1, wherein the predetermined number of data from the plurality of data is zero.

3. The image processing system of claim 1, wherein the plurality of processed data is larger than the plurality of data.

4. The image processing system of claim 1, wherein the image processing system is contained within a peripheral device.

5. The image processing system of claim 1, wherein the image processing system is contained within a stand alone device.

6. A sample rate conversion method used to convert a plurality of data from a first sample rate to a second sample rate, the first and second sample rates being associated to a clock signal, the sample rate conversion method comprising:
   selecting a predetermined number of data from the plurality of data, the predetermined number of data having the first sample rate;
   selecting a predetermined number of phases from a phase filter, the phase filter having a plurality of phases, the predetermined number of phases being appropriately chosen for the predetermined number of data;
   processing the predetermined number of data using the predetermined number of phases to form a plurality of processed data; and
   selecting a predetermined number of the plurality of processed data in response to a predetermined number of clock signals, the selected predetermined number of the processed data having the second sample rate.

7. The sample rate conversion method of claim 6, wherein the phase filters are selected from a poly-phase filter, the poly-phase filter having a plurality of phases.

8. The sample rate conversion method of claim 6, wherein:
   the phase filter comprises a finite impulse response filter; and
   the predetermined number of phases comprises a plurality of coefficients of the finite impulse response filter.

9. The sample rate conversion method of claim 6, wherein the predetermined number of phases from a phase filter are stored in a memory.

10. The sample rate conversion method of claim 9, wherein the memory comprises a ping pong buffer.

11. The sample rate conversion method of claim 6, wherein the processing the predetermined number of data using the predetermined number of phases comprises multiplying each of the predetermined number of data by at least one of the predetermined number of phases.

12. The sample rate conversion method of claim 6, wherein the second rate is not an integer multiple of the first sample rate.

13. The sample rate conversion method of claim 6, wherein a data control buffer determines the predetermined number of data to be selected from the plurality of data.

14. The sample rate conversion method of claim 6, wherein a coefficient control buffer determines an indexing sequence for the phase filter, the indexing sequence being used to select the predetermined number of phases from the phase filter.

15. The sample rate conversion method of claim 6, wherein the sample rate conversion method is performed using a peripheral device.

16. The sample rate conversion method of claim 6, wherein the sample rate conversion method is performed using a stand alone device.

17. An image processing system comprising:

a clock signal;

a data control buffer used to select a predetermined number of data from a plurality of data in response to the clock signal, the predetermined number of data having a first sample rate, the data control buffer comprising a ping pong buffer;

a coefficient control buffer used to select a predetermined number of phases from a phase filter, the phase filter having a plurality of phases;

a processor that processes the predetermined number of data using the predetermined number of phases to form a plurality of processed data; and an output buffer that stores the plurality of processed data, the output buffer releases predetermined number of the plurality of processed data in response to a predetermined number of clock signals, the predetermined number of the plurality of processed data having a second sample rate.

18. The image processing system of claim 17, wherein the image processing system is contained within at least one of a peripheral device and a stand alone device.

19. The image processing system of claim 17, wherein phase filters are selected from a poly-phase filter, the poly-phase filter having a plurality of phases.

20. The image processing system of claim 17, wherein:

the phase filter comprises a finite impulse response filter; and the predetermined number of phases comprise a plurality of coefficients of the finite impulse response filter.

* * * * *